(12) United States Patent
McKay et al.

(10) Patent No.: US 11,507,355 B2
(45) Date of Patent: Nov. 22, 2022

(54) ENFORCEMENT OF SIGNATURES FOR SOFTWARE DEPLOYMENT CONFIGURATION

(71) Applicant: International Business Machines Corporation, Armonk, NY (US)

(72) Inventors: Michael S. McKay, Apex, NC (US); Jacob Andrew Kitchener, Raleigh, NC (US); Richard Adam King, Cary, NC (US); Alexander Lewitt, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/932,887

(22) Filed: Jul. 20, 2020

(65) Prior Publication Data
US 2022/0019418 A1 Jan. 20, 2022

(51) Int. Cl.
| G06F 9/445 | (2018.01) |
| G06F 8/60 | (2018.01) |
| H04L 9/32 | (2006.01) |
| H04L 67/00 | (2022.01) |
| H04L 9/06 | (2006.01) |

(52) U.S. Cl.
CPC .............. *G06F 8/60* (2013.01); *H04L 9/0643* (2013.01); *H04L 9/3236* (2013.01); *H04L 9/3247* (2013.01); *H04L 67/34* (2013.01)

(58) Field of Classification Search
CPC ........................................................ G06F 8/60
USPC ......................................................... 717/177
See application file for complete search history.

(56) References Cited

U.S. PATENT DOCUMENTS

| 7,188,362 | B2 * | 3/2007 | Brandys ............... G06Q 20/341 713/185 |
| 7,865,889 | B1 | 1/2011 | Bird |
| 8,166,304 | B2 * | 4/2012 | Murase .................. G06F 21/51 713/192 |
| 8,244,831 | B1 * | 8/2012 | McLennan .............. G06F 16/27 709/217 |
| 8,646,070 | B1 * | 2/2014 | Patsenker ............... G06F 21/57 726/22 |
| 8,909,928 | B2 | 12/2014 | Ahmad et al. |
| 8,924,723 | B2 * | 12/2014 | Chang ................... G06F 21/445 713/168 |
| 9,158,913 | B2 | 10/2015 | Shimoni et al. |
| 9,202,062 | B2 | 12/2015 | Mackintosh et al. |
| 9,531,719 | B1 * | 12/2016 | Sutton ..................... H04L 63/10 |
| 10,223,361 | B2 | 3/2019 | Srinivasan et al. |
| 10,365,922 | B1 * | 7/2019 | Wang .................... H04L 63/123 |

(Continued)

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Evral E Bodden
(74) *Attorney, Agent, or Firm* — Edward J. Wixted, III

(57) ABSTRACT

In an approach, a process intercepts a deployment resource associated with software prior to deploying the software to a node, where the deployment resource configures how the software is deployed and operates. A processor verifies authenticity of a digital signature present within the deployment resource. A processor, responsive to verifying the authenticity of the digital signature, deploys the software to the node in accordance with the deployment resource.

20 Claims, 9 Drawing Sheets

(56) References Cited

U.S. PATENT DOCUMENTS

| | | |
|---|---|---|
| 10,409,978 B2 | 9/2019 | Bish et al. |
| 10,719,373 B1* | 7/2020 | Koponen .............. H04L 9/0891 |
| 10,915,349 B2* | 2/2021 | Ranjan ................ G06F 9/45558 |
| 10,931,650 B1* | 2/2021 | McCown .............. G06F 21/602 |
| 11,212,095 B2* | 12/2021 | Brickell .............. H04W 12/086 |
| 2003/0028867 A1* | 2/2003 | Kryloff .................. G06F 8/658 |
| | | 717/171 |
| 2005/0210099 A1 | 9/2005 | Oswalt |
| 2007/0300057 A1 | 12/2007 | Corcoran |
| 2008/0127169 A1* | 5/2008 | Malasky ............. G06F 9/44547 |
| | | 717/174 |
| 2010/0107160 A1 | 4/2010 | Srinivasan |
| 2015/0261811 A1 | 9/2015 | Muhlestein |
| 2019/0268164 A1* | 8/2019 | Rossetti ................ H04L 9/3247 |
| 2020/0019704 A1 | 1/2020 | Tora et al. |

\* cited by examiner

Admission Policy:
- spec.replicas: bobsmith@foo.com||charles@foo.com
-spec.template.metadata.*: chrisbuck@foo.com
-spec.template.spec.containers.image: bobsmith@foo.com
-spec.template.spec.containers.ports: bobsmith@foo.com
- spec.template.spec.containers.env.*: alicejones@foo.com||bobsmith@foo.com

FIG. 7

```
apiVersion: apps/v1
kind: Deployment
metadata:
 name: nginx-deployment
 labels:
   app: nginx
 annotations:
   signatures:
     - spec.replicas: bobsmith@foo.com:asodj;oiwefjo;aiwejfaojrfio;aejrfio;aiwejfaojrfio
     - spec.template.metadata.*: chrisbuck@foo.com:asodj;oiwefjo;aiwejfaojrfio;aejrfio;aiwejfaojrfio
     - spec.template.spec.containers.image: bobsmith@foo.com:alsdj;pioaewfkawekockp'woekfpoa'woekfpoa
     - spec.template.spec.containers.ports: bobsmith@foo.com:alsdj;pioaewfkawekockp'woekfpoa'woekfpoa
     - spec.template.spec.containers.env.*: alicejones@foo.com:aawe;faoewfjo;aifr;oaksjfdl;kajsdgklajfdgklsjd
spec:
 replicas: 3
 selector:
  matchLabels:
    app: widget
 template:
  metadata:
   labels:
    app:widget
  spec:
   containers:
   - name: widget
     image: widget:1.7.9
     ports:
     - containerPort: 80
     env:
     - name: MONGO_URL
       valueFrom:
         secretKeyRef:
           key: mongo_url
           name: razeedash-secret
 status:
  conditions:
    - lastTransitionTime: "2019-09-11T08:32:47Z"
      lastUpdateTime: "2019-09-11T08:32:47Z"
      message: Deployment has minimum availability.
      reason: MinimumReplicasAvailable
      status: "True"
      type: Available
  observedGeneration: 8
  replicas: 1
  unavailableReplicas: 1
  updatedReplicas: 1
```

The block of signature annotations is labeled 810. The entire listing is labeled 800.

FIG. 8

```
apiVersion: apps/v1
kind: Deployment
metadata:
  name: nginx-deployment
  labels:
    app: nginx
  annotations:
    signatures:
      - spec.replicas: bobsmith@foo.com:asodj;oiwefjo;aiwejfaojrfio;aejrfio;aiwejfaojrfio
      - spec.template.metadata.*: bobsmith@foo.com:asofj;oiwefjo;aiwejfaojrfio;aejrfio;aiwejfaojrfio
      - spec.template.spec.containers.image: bobsmith@foo.com:alsdj;pioaewfkawekockp'woekfpoa'woekfpoa
      - spec.template.spec.containers.ports: bobsmith@foo.com:alsdj;pioaewfkawekockp'woekfpoa'woekfpoa
      - spec.template.spec.containers.env.*: alicejones@foo.com:aawe;faoewfjo;aifr;oaksjfdl;kajsdgklajfdgklsjdhfg
spec:
  replicas: 3
  selector:
    matchLabels:
      app: widget
  template:
    metadata:
      labels:
        app:widget
    spec:
      containers:
      - name: widget
        image: widget:1.7.9
        ports:
        - containerPort: 80
        env:
        - name: MONGO_URL
          valueFrom:
            secretKeyRef:
              key: mongo_url
              name: razeedash-secret
status:
  conditions:
  - lastTransitionTime: "2019-09-11T08:32:47Z"
    lastUpdateTime: "2019-09-11T08:32:47Z"
    message: Deployment has minimum availability.
    reason: MinimumReplicasAvailable
    status: "True"
    type: Available
  observedGeneration: 8
  replicas: 1
  unavailableReplicas: 1
  updatedReplicas: 1
```

900

910 (annotations signatures block)

FIG. 9

ENFORCEMENT OF SIGNATURES FOR SOFTWARE DEPLOYMENT CONFIGURATION

BACKGROUND

The present invention relates generally to the field of software deployment, and more particularly to enforcement of signatures of software deployment configuration data.

Software deployment includes all of the activities that make a software system available for use. Typically, two necessary items for software deployment are content and configuration. Configuration refers to data that configures the way an application is deployed and how the application operates once it is deployed. Configuration files are used to configure the parameters and initial settings for an application or container. Example configuration files include Kubernetes® YAML Ain't Markup Language (YAML) and Ansible® Playbooks. Ansible® is a trademark or registered trademark of Red Hat, Inc. or its subsidiaries in the United States and other countries.

Cryptographic signing techniques, such as digital signatures, are mathematical schemes for verifying the authenticity of digital messages or documents. A valid digital signature gives one a strong reason to believe that the document was created or edited by the signer and that the message was not altered in transit. Digital signatures employ asymmetric cryptography and may provide a layer of validation and security to messages or documents sent through non-secure channels. There are typically three algorithms involved with the digital signature process. A key generation algorithm produces a signature upon receiving a private key along with its corresponding public key. A signing algorithm produces a signature upon receiving a private key and message or data that is being signed. A verification algorithm checks for the authenticity of the message by verifying the message along with the signature and public key.

SUMMARY

Aspects of an embodiment of the present invention disclose a method, computer program product, and computer system. A processor intercepts a deployment resource associated with software prior to deploying the software to a node, where the deployment resource configures how the software is deployed and operates. A processor verifies authenticity of a digital signature present within the deployment resource. A processor, responsive to verifying he authenticity of the digital signature, deploys the software to the node in accordance with the deployment resource.

BRIEF DESCRIPTION OF THE DRAWINGS

FIG. 7 is an example admission policy according to an embodiment of the present invention.

FIG. 8 is an example deployment resource according to an embodiment of the present invention.

FIG. 9 is another example deployment resource according to an embodiment of the present invention.

DETAILED DESCRIPTION

Figure 1:
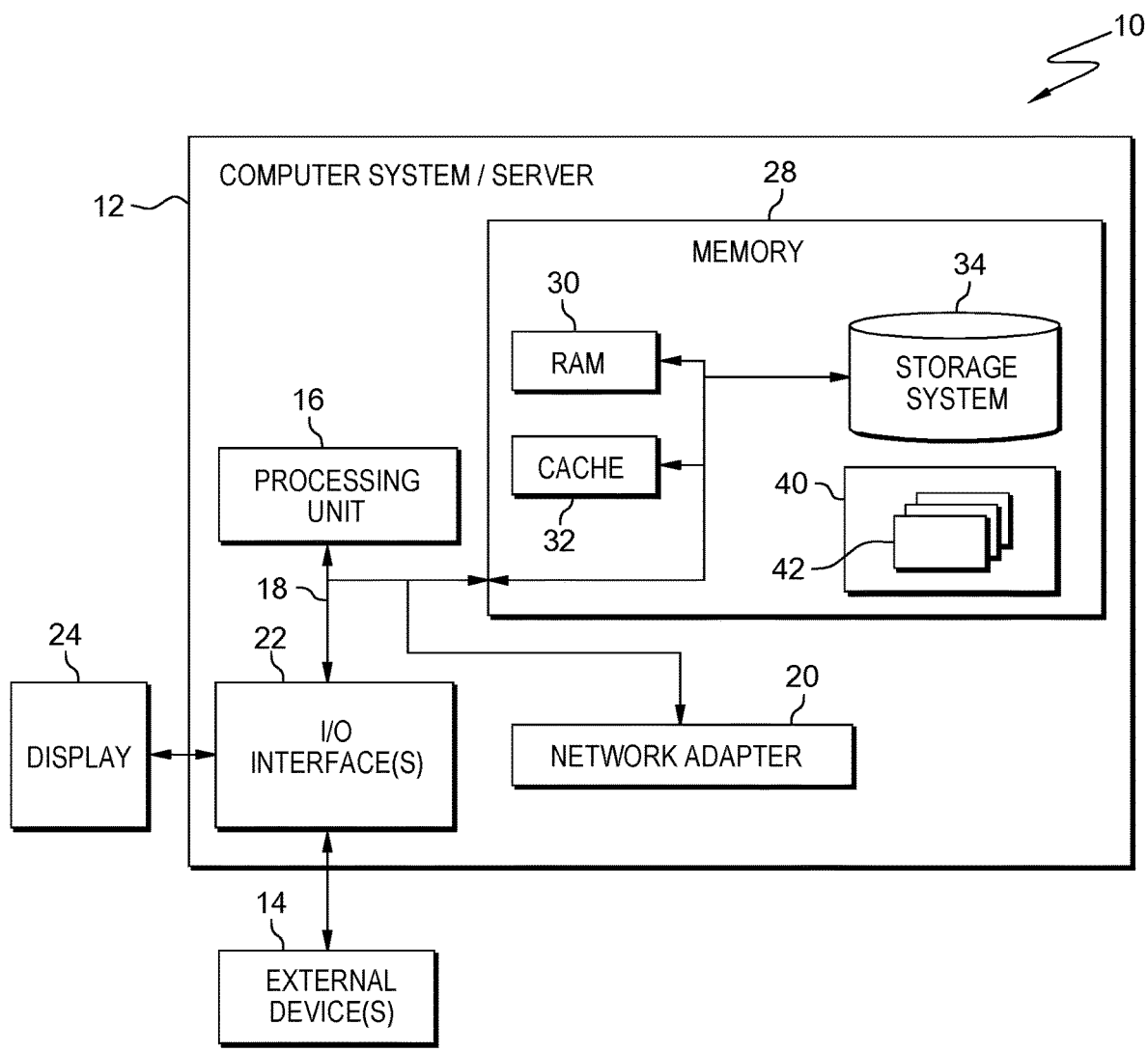
FIG. 1 depicts a cloud computing node according to an embodiment of the present invention.

Software deployment includes the software that is to be deployed (i.e., the content), and configuration data. The configuration data and associated deployment metadata, collectively referred to herein as deployment resources, can include sensitive data which configures the way an application is deployed and how the application operates once the application is deployed. Embodiments of the present invention recognize that, in software deployment, there are currently not ways to verify the origin and integrity of configuration data and associated deployment metadata. Embodiments of the present invention further recognize that verification of both the content and the deployment resources is critical to the security of a software platform. Embodiments of the present invention provide an approach for using cryptographic signing techniques to sign software deployment configuration and/or metadata deployment resources. Systems can then rely on the cryptographic signing techniques to verify the origin and integrity of the deployment resources and determine whether the signatures conform to an admission policy. Subsequently, such verification can be used to determine whether or not to deploy software according to the provided deployment resources.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
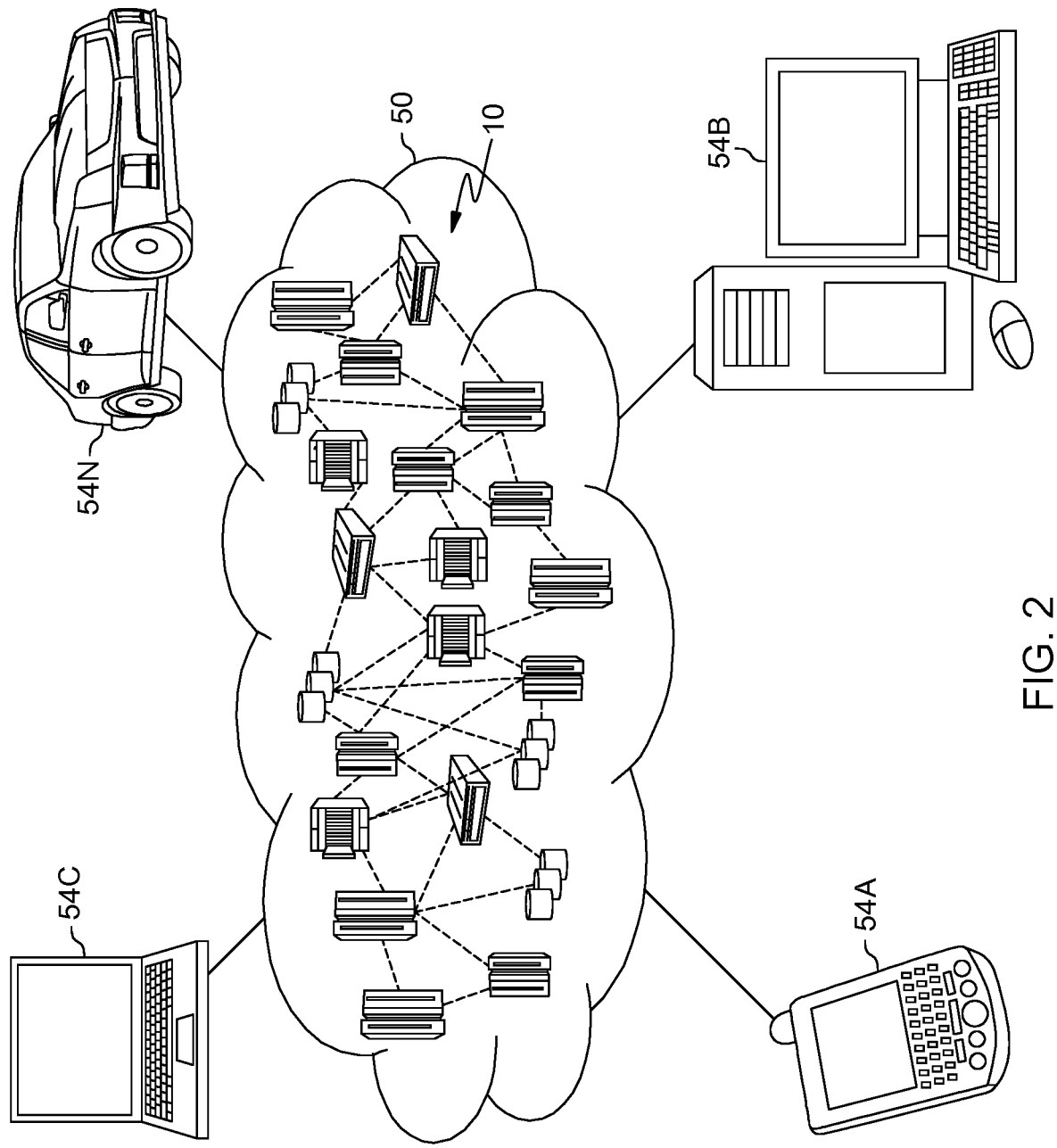
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
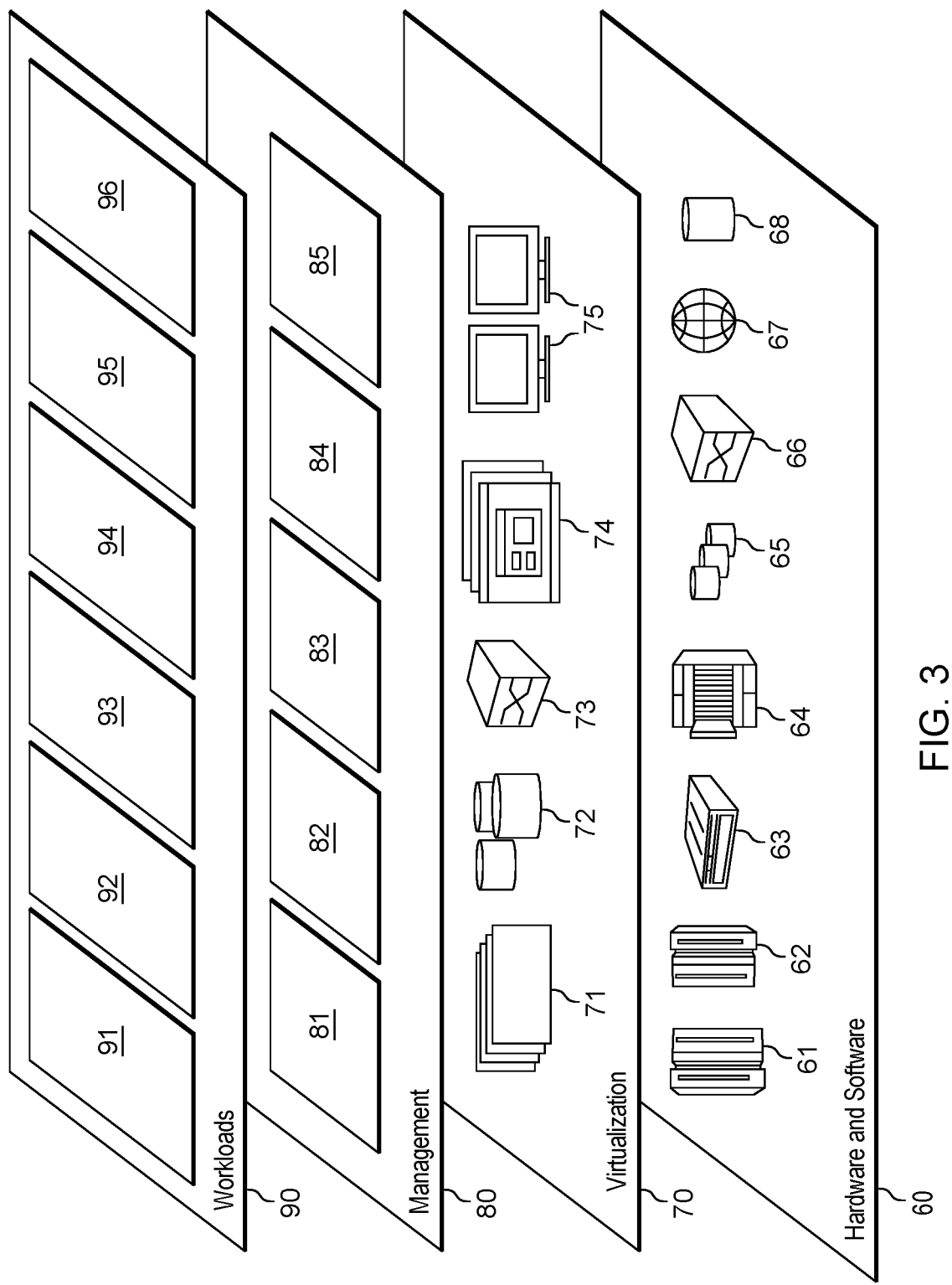
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 4:
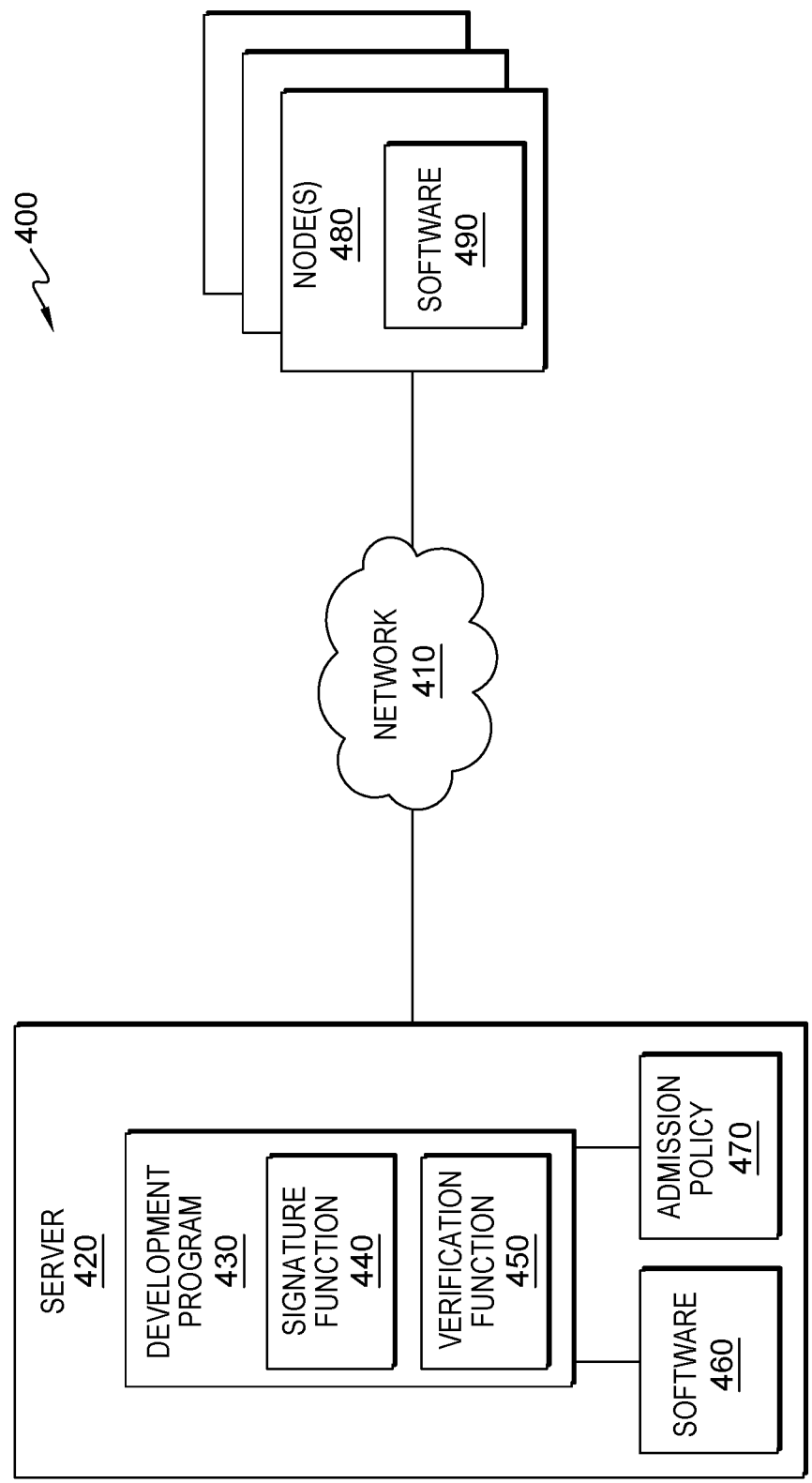
FIG. 4 depicts a block diagram of a computing environment according to an embodiment of the present invention.

FIG. 4 is a functional block diagram illustrating a computing environment, generally designated 400, in accordance with one embodiment of the present invention. Computing environment 400 is a partial depiction of one example of an architecture of cloud computing environment 50, as described in reference to FIG. 2. FIG. 4 provides only an illustration of one embodiment and does not imply any limitations with regards to the environments in which different embodiments may be implemented.

In the depicted embodiment, computing environment 400 includes server 420 and node(s) 480 interconnected over network 410. Network 410 may be a local area network (LAN), a wire area network (WAN), such as the Internet, the public switched telephone network (PSTN), any combination thereof, or any combination of connections and protocols that will support communications between server 420 and node(s) 480. Network 410 may include wired, wireless, or fiber optic connections. Computing environment 400 may include additional servers, computing devices, or other devices not shown.

Server 420 may be a management server, a web server, or any other electronic device or computing system capable of receiving and sending data. In some embodiments, server 420 may be a laptop computer, tablet computer, personal computer (PC), a desktop computer, or any programmable electronic device capable of communicating with node(s) 480 via network 410. In one embodiment, server 420 represents a node, such as node 10, of a cloud computing environment, such as cloud computing environment 50 (see FIG. 2). In some embodiments, server 420 may represent a server computing system utilizing clustered computers and components to act as a single pool of seamless resources. In the depicted embodiment, server 420 contains, at least, deployment program 430, signature function 440, verification function 450, software 460, and admission policy 470.

Node(s) 480 may be a management server, a web server, or any other electronic device or computing system capable of receiving and sending data. In some embodiments, node(s) 480 may be a laptop computer, tablet computer, netbook computer, personal computer (PC), a desktop computer, or any programmable electronic device capable of communicating with server 420 via network 410. In one embodiment, node 480 is one example of a computing device, such as computing devices 54A-54N, used to access and/or communicate with cloud computing environment 50. In another embodiment, node 480 represents a node, such as node 10, of a cloud computing environment, such as cloud computing environment 50 (see FIG. 2). In some embodiments, node 480 may represent a server computing system utilizing multiple computers as a server system, such as in a cloud computing environment. In some embodiments, node 480 represents a computing system utilizing clustered computers and components to act as a single pool of seamless resources. In the depicted embodiment, node 480 includes software 490. While depicted as a plurality of nodes, node(s) 480 may, in various embodiments, represent one or any other number of nodes.

In one embodiment, server 420 and node(s) 480 are part of a Kubernetes® environment, where server 420 represents a master node and node(s) 480 represent one or more worker nodes. In such an embodiment, verification function 450 may be a part of an application programming interface (API) server within the master node.

Deployment program 430 executes on server 420. Deployment program 430 may be a dedicated deployment program, a function integrated within another program, such as an orchestration or software deployment program, or any other program or function that can communicate with nodes 480 and provide a user interface for interacting with deployment resources and creating/enforcing cryptographic signatures of deployment resources. In other embodiments, deployment program 430 may reside on other devices, provided that deployment program 430 can communicate with software 460, admission policy 470, and node(s) 480. Deployment program 430 may include signature function 440 and verification function 450.

Signature function 440 operates to receive a selection of one or more sections of a deployment resource that are to be signed, encrypt selected sections, and append a signature to the deployment resource. Signature function 440 may be a function of deployment program 430 or may be a stand-alone program. In one embodiment, signature function 440 resides on server 420. In other embodiments, signature function may reside on another server or another computing device, provided that signature function 440 is accessible to deployment program 430 and has access to software 460 and/or admission policy 270.

Verification function 450 operates to intercept deployment resources, prior to deployment of software, and verify whether signatures present within the deployment resources comply with an admission policy. Verification function 450 may be a function of deployment program 430 or may be a stand-alone program. In a Kubernetes® environment, verification function 450 may be implemented as an admission controller. An admission controller is a piece of code that intercepts requests to the Kubernetes® API server. In one embodiment, verification function 450 resides on server 420. In other embodiments, verification function 450 may reside on another server or another computing device, provided that verification server is accessible to deployment program 430 and has access to software 460 and admission policy 470.

Software 460 may be a repository that may be written and read by deployment program 430 and signature function 440 and may be accessible to verification function 450. Software 460 may include, for example, software and deployment resources, such as configuration files (e.g., YAML, Ansible® Playbooks) and associated metadata. The software content may include, for example, virtual machine and container images. In general, software 460 may include any combination of content and configuration data capable of being deployed to node(s) 480. Software 460 may be, for example, a database.

Admission policy 470 may be a repository that may be written and read by deployment program 430 and accessible to signature function 440 and/or verification function 450. Admission policy 470 may include one or more admission policies for the deployment of software resources. In general, the admission policy specifies signature requirements, for either particular sections or an entire configuration file, that are required to be met in order to deploy software. More particularly, admission policy 470 may specify particular sections of configuration files and required signatures for each of the particular sections. An example admission policy is depicted in FIG. 7. Each admission policy may specify one or more individuals, via some identification means, for example, an email address or user identification. The admission policy further specifies a particular path indicating the section of a configuration file that is required to be signed by the identified individual. The admission policy may specify any number of particular individuals that are required to sign a section, or may not specify any individual if, for example, no signature is required. In some embodiments, if multiple users are listed, each listed individual is required to sign the section. In other embodiments, if multiple users are listed, at least one of the listed individuals is required to sign the section. The applicable admission policy may vary based on factor such as client, target node, type of software. In some embodiments, the admission policy is manually input but a client or entity responsible for the deployment.

Software 490 may be software that has been deployed by deployment program 430 after meeting applicable admission policy requirements that have been verified by verification function 450. Software 490 may be, for example, a container, virtual machine, application, or any other software capable of being deployed.

Figure 5:
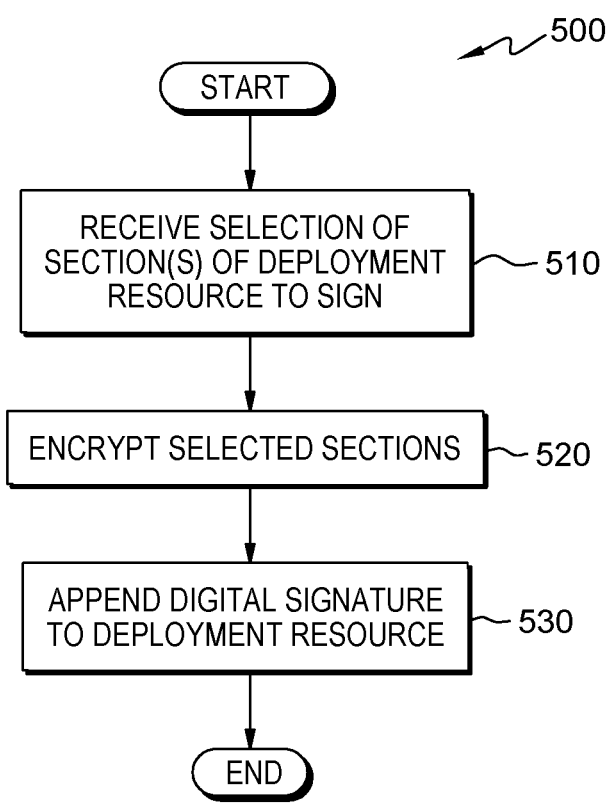
FIG. 5 is a flowchart depicting operational steps for creating digital signatures in a deployment resource according to an embodiment of the present invention.

FIG. 5 depicts a flowchart 500 of the steps of signature function executing within the computing environment of FIGS. 1-4, for adding digital signatures to deployment resources, such as configuration files, in accordance with one embodiment of the present invention.

In one embodiment, initially, an administrative user creates or edits deployment resources, such as configuration files that correspond to software to be deployed, such as software stored at software 460. Examples of such configuration files are shown in FIGS. 8 and 9. A configuration file may be, for example, a YAML file. In general, configuration files are used to configure the parameters and initial settings for software to be deployed. Embodiments of the present invention recognize the importance of providing cryptographic signing techniques to deployment resources such as configuration files because such deployment resources can contain sensitive data which configures the way an application or other software is deployed and operates subsequent to deployment. A configuration file may include multiple sections and an organizational structure that may allow an administrative user to select particular sections within the configuration file.

In step 510, signature function 440 receives a selection of one or more sections of the deployment resource to sign. In some instances, the signing user may select all of the sections, or specify that the entire file is to be signed. However, in other instances the signing user may select one of more sections of the deployment resource. The selected sections represent sections of the deployment resource that the signing user intends to verify, or vouch for the work product contained in the content of each selected section. In some instances, the selected sections may correspond to sections that the user has edited or created. In other instances, the selected sections may correspond to sections that the user has reviewed. The selected sections may be identified via dot notation, slash notation, or by another means. In some embodiments, signature function 440 provides text input options to provide such notation. In other embodiments, signature function 440 may allow a user to highlight or select the one or more sections of the deployment resource utilizing a graphic user interface and, for example, a cursor.

In step 520, signature function 440 encrypts the selected sections as one or more digests and/or encrypted messages. In some embodiments, a one-way hash function is utilized to create a message digest for each of the selected sections. A message digest is a fixed size numeric representation of the contents of a message, computed by a hash function. A message digest can be encrypted, forming a digital signature. As such, in other embodiments, the created message digest(s) are encrypted with a private key to create a digital signature. In such embodiments, the corresponding public key has either (i) already been made accessible to verification function 450 or (ii) will be made accessible to verification function 450 prior to verifying the deployment resource. In some embodiments, the corresponding public key is stored to admission policy 470.

In step 530, signature function 440 appends the digital signature to the deployment resource. It should be noted that, in embodiments that only require a message digest, the message digest, rather than the digital signature, is appended to the resource. In embodiments that require a digital signature, the digital signature is appended to the deployment resource. In some embodiments, the digital signature is appended as an annotation at the top level of the metadata for the deployment resource. However, embodiments of the present invention recognize that the digital signature may be appended at any location of the deployment resource. Along with the digital signature, signature function 440 may also include a description of what sections and/or attributes are included within the signature. To put it another way, the digital signature is attesting to the verification of what sections. The description of what sections are included within the signature may take any format such as, but not limited to, dot notation or slash notation. For example, if the configuration file is a YAML file, dot notation may be used to describe the path to section of the YAML file associated with the signature.

The appended digital signature acts as a way to secure and verify the origin and integrity of the configuration and employment metadata and can be used by verification function 450 to verify the presence and authenticity of signatures by one or more required parties or individuals.

Figure 6:
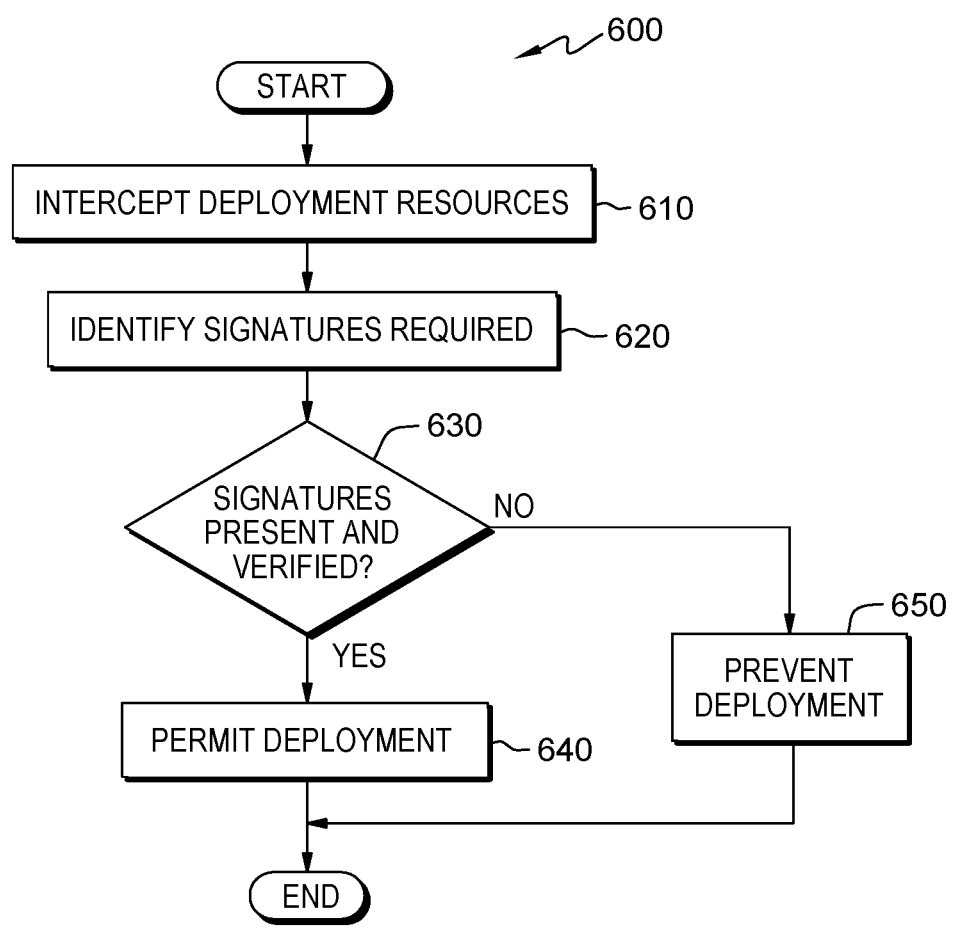
FIG. 6 is a flowchart depicting operational steps for verifying digital signatures in a deployment resource according to an embodiment of the present invention.

FIG. 6 depicts a flowchart 600 of the steps of verification function 450 executing within the computing environment of FIGS. 1-4, for verifying signatures of deployment resources, such as configuration files, against an admission policy prior to software deployment, in accordance with one embodiment of the present invention.

In one embodiment, initially, software from software 460 is to be deployed to one or more nodes. An admission policy has been created and stored to admission policy 470, the admission policy specifying signature requirements for one or more sections (or entire configuration files) associated with the software deployment. In addition, if digital signatures are being utilized, one or more public keys associated with the individuals required by the admission policy may be accessible to verification function 450 and, in some embodiments, such public keys are also stored to the repository of admission policy 470, or another database/repository accessible to verification function 450.

In step 610, verification function 450 intercepts deployment resources, prior to deployment of the corresponding software. In some embodiments, verification function 450 is a Kubernetes® admission controller. An admission controller is a piece of code that intercepts requests to a Kubernetes® API server prior to persistence of the object, but after the request is authenticated and authorized. In embodiments of the current invention, verification function 450 would operate as a validating controller. Validating controllers may not modify the objects they admit. In other environments, verification function 450 may be any function of deployment program 430 that operates to intercept deployment resources prior to deployment of the corresponding software.

In step 620, verification function 450 identifies signatures required for deployment. Verification function 450 may access a previously stored admission policy, such as a previously stored admission policy stored to admission policy 470. As previously described, the admission policy corresponds to the particular software, client associated with node(s) 480 that the software is to be deployed to, development/deployment team, or other factors that have been established and stored in the admission policy prior to initiating the deployment. Verification function 450 may extract from the associated admission policy, one or more signatures required and any associated sections that are associated with those signatures.

In decision 630, verification function 450 determines whether signatures are present and verified in the intercepted deployment resources. Verification function 450 compares the signatures present in the configuration file or other deployment resource and determines whether the required signatures are present. In addition, verification function 450 utilizes hash algorithms and/or public keys associated with each of the signatures to identify whether the signatures are valid. Verification of the signatures is accomplished by applying a hash function to the data and decrypting the signature using the signer's public key. If the resulting hashes are equal, the signature can be confirmed as valid. As described with reference to signature function 440, verification function 450 determines which sections are associated with a signature based on the appended path or other description of the section(s). In some embodiments, the admission policy may specify multiple signatures may be required for one section. In other embodiments, the admission policy may specify that at least one of the following signatures are required for a particular section. Not all sections may require signature verifications.

If verification function 450 determines that all necessary signatures are present and verified (decision 630, yes branch), verification function 450 permits deployment of the software to node(s) 480 (step 640) in accordance with the configuration and deployment parameters, resulting in software 490 operating on associated node(s) 480.

If verification function 450 determines that necessary signatures are not all present and/or not all of the necessary signatures can be verified as authentic (decision 630, no branch), verification function prevents deployment of the software to node(s) 480. In some embodiments, in addition to preventing the deployment from occurring, verification function 450 may generate an error or other notification. Such an error or communication may be communicated to administrative users associated with the deployment, users associated with each of the node(s) 480 that were expecting the deployment of the software, and/or other users. In some embodiments, the notification may include details as to what caused the software to be unable to be deployed. For example, verification function 450 may specify the required signatures that were missing from the deployment resource and/or signatures that were unable to be authenticated or verified. A failure to authenticate or verify a signature may mean that, subsequent to the signer creating the signature, the section(s) associated with the signature were modified. Such notifications may provide the administrative user(s) responsible for deploying the software with details to better enable them to correct any issues with the deployment resource, resign various sections, as necessary, and attempt to deploy the software again.

FIG. 7 depicts an example admission policy 700 that is used to enforce signature requirements for the deployment resources depicted by FIGS. 8 and 9.

Admission policy 700 depicts five sections that include signature requirements. More particularly, "spec.replicas," "spec.template.metadata.*", "spec.template.spec.containers.image," "spec.template.spec.containers.ports," and "spec.template.spec.containers.env.*." The paths designating the sections are written in dot notation, but embodiments of the present invention recognize other types of notation or descriptive means to identify the section(s) may be utilized. The "*" acts as a wildcard and denotes that, for example, all subsections of the metadata heading are to be signed. Each section also includes a signature requirement for that section that appears after the colon. As depicted, some sections require a single signature and other sections require at least one signature from multiple listed signatures (with the "or" depicted as "||"). While not depicted, in admission policy 700, other admission policies may list multiple signatures for a particular section and require that all of the listed signatures be obtained prior to deploying the software. For example, while not included in admission policy 700, a policy requiring multiple signatures could be "spec.template.spec.containers.ports: bobsmith@foo.com&&alicejones@foo.com" (with the "and" depicted as "&&").

FIG. 8 depicts an example configuration file or deployment resource, referred to herein as deployment resource 800. As depicted, deployment resource 800 corresponds to admission policy 700 and is an example of a deployment resource that will pass verification by verification function 450.

Deployment resource 800 includes signature section 810 that has been appended to deployment resource 800 as an annotation and signature section 810 includes digital signatures and paths that correspond to requirements of admission policy 700. Each signature includes (i) a path, designating the section that has been signed, a signer identification tag (in the depicted example, the signer identification tag is an email address), and an encrypted signature, depicted as a long string of characters. As described above, the encrypted signature is generated using a hash algorithm and/or private key of the signer. The signatures have been appended to deployment resource 800 by signature function 440 and can be verified by verification function 450 by access admission policy 700 from the repository admission policy 470. Verification function 450 may utilize public keys associated with the signers to verify that the encrypted signature is legitimate and that the data in the associated section has not been modified.

When comparing deployment resource 800 to admission policy 700, all of the signature requirements specified by admission policy 700 are present. Assuming verification function 450 is able to verify the integrity of the signatures, deployment resource 800 will be able to be utilized in configuring the software during the software deployment process.

In contrast, FIG. 9 depicts a deployment resource 900 that will not satisfy the requirements of admission policy 700. In reviewing signature section 910, signature 920 specifies "bobsmith@foo.com" whereas admission policy 700 requires, for section "spec.template.metadata.*" a signature from "chrisbuck@foo.com." Accordingly, verification function 450 will determine that a required signature from admission policy 700 is missing and will prevent deployment resource 900 from being used to configure corresponding software scheduled to be deployed to node(s) 480. In addition, while not depicted, deployment resource 900 may also suffer from a signature that cannot be verified. For example, if a required signature was added, and then, subsequent to the addition of the signature, data from the associated section was modified, the signature would no longer be valid as the change to the content of the section would result in a mismatch during the verification process. In such a situation, verification function 450 would again determine that the deployment resource cannot be processed for the software deployment due to an invalid signature.

As described previously, verification function 450 may generate an error or notification describing the deficiencies in deployment resource 900. In this particular example, verification function 450 may generate a notification identifying that "bobsmith@foo.com" has signed the "spec.template.metadata.*" section of deployment resource 900 and that admission policy 700 requires a digital signature from "chrisbuck@foo.com." Further, assuming another signature was determined by verification function 450 to be invalid, verification function 450 would cause the notification to identify the invalid signature. Such information could be utilized by administrative users to address the deficiencies and update deployment resource 900 such that it meets the signature requirements of admission policy 700.

While FIGS. 8 and 9 are depicted as YAML configuration files, it should be noted that any type of deployment resource or configuration file may be utilized by various embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   intercepting, by one or more processors, a deployment resource file associated with software prior to deploying the software to a node, wherein the deployment resource file comprises configuration data;

identifying, by one or more processors, that a required user generated digital signature is necessary for deployment of the software, the digital signature comprising a message digest of a section, of a plurality of sections, of the deployment resource file encrypted with a private key of the required user, wherein:
    identifying that the required user generated digital signature is necessary for deployment of the software comprises retrieving, by one or more processors, an admission policy; and
    the admission policy specifies, in the deployment resource file, a corresponding user signature required for each section of the plurality of sections;
verifying, by one or more processors, presence and authenticity of the required user generated digital signature within the deployment resource file;
responsive to verifying the presence and authenticity of the required user generated digital signature, deploying, by one or more processors, the software to the node in accordance with the deployment resource file.

2. The computer-implemented method of claim 1, wherein:
    the admission policy further specifies the required user generated digital signature that is necessary for deployment of the software;
    the admission policy is external to the deployment resource file; and
    verifying the presence and the authenticity of the required user generated digital signature within the deployment resource file comprises verifying, by one or more processors, that the required user generated digital signature specified in the admission policy is present within the deployment resource file.

3. The computer-implemented method of claim 1, further comprising:
    receiving, by one or more processors, a selection of a section within the deployment resource file for the required user to sign;
    encrypting, by one or more processors, the selected section with a hash function and the private key; and
    appending, by one or more processors, the required user generated digital signature and identification of the section within the deployment resource file.

4. The computer-implemented method of claim 3, wherein verifying the presence and the authenticity of the required user generated digital signature comprises:
    decrypting, by one or more processors, the required user generated digital signature; and
    comparing, by one or more processors, a resulting hash function to a hash function associated with data at the section.

5. The computer-implemented method of claim 1, wherein the admission policy further specifies, in the deployment resource file, a plurality of sections of a configuration file.

6. The computer-implemented method of claim 1, wherein the deployment resource file is a Kubernetes YAML file.

7. The computer-implemented method of claim 3, wherein (i) the required user generated digital signature and (ii) identification of the section within the deployment resource file are each appended to an annotation in a top level metadata for the deployment resource file.

8. The computer-implemented method of claim 1, wherein an admission controller intercepts the deployment resource file associated with the software prior to deployment of the software to the node.

9. A computer program product comprising:
    one or more computer readable storage media, and program instructions collectively stored on the one or more computer readable storage media, wherein the one or more computer readable storage media are not transitory signals per se, the program instructions comprising:
    program instructions to intercept a deployment resource file associated with software prior to deploying the software to a node, wherein the deployment resource file comprises configuration data;
    program instructions to identify that a required user generated digital signature is necessary for deployment of the software, the digital signature comprising a message digest of a section, of a plurality of sections, of the deployment resource file encrypted with a private key of the required user, wherein:
        program instructions to identify that the required user generated digital signature is necessary for deployment of the software comprise program instructions to retrieve an admission policy; and
        the admission policy specifies, in the deployment resource file, a corresponding user signature required for each section of the plurality of sections;
    program instructions to verify presence and authenticity of the required user generated digital signature within the deployment resource file;
    program instructions, responsive to verifying the presence and authenticity of the required user generated digital signature, to deploy the software to the node in accordance with the deployment resource file.

10. The computer program product of claim 9, wherein:
    the admission policy further specifies the required user generated digital signature that is necessary for deployment of the software;
    the admission policy is external to the deployment resource file; and
    program instructions to verify the presence and the authenticity of the required user generated digital signature within the deployment resource file comprises program instructions, collectively stored on the one or more computer readable storage media, to verify that the required user generated digital signature specified in the admission policy is present within the deployment resource file.

11. The computer program product of claim 9, further comprising:
    program instructions, collectively stored on the one or more computer readable storage media, to receive a selection of a section within the deployment resource file for the required user to sign;
    program instructions, collectively stored on the one or more computer readable storage media, to encrypt the selected section with a hash function and the private key; and
    program instructions, collectively stored on the one or more computer readable storage media, to append the required user generated digital signature and identification of the section within the deployment resource file.

12. The computer program product of claim 11, wherein program instructions to verify the presence and the authenticity of the required user generated digital signature comprise:

program instructions to decrypt the required user generated digital signature; and program instructions to compare a resulting hash function to a hash function associated with data at the section.

13. The computer program product of claim 9, wherein the admission policy further specifies, in the deployment resource file, a plurality of sections of a configuration file.

14. The computer program product of claim 11, wherein (i) the required user generated digital signature and (ii) identification of the section within the deployment resource file are each appended to an annotation in a top level metadata for the deployment resource file.

15. A computer system comprising:

one or more computer processors, one or more computer readable storage media, and program instructions collectively stored on the one or more computer readable storage media for execution by at least one of the one or more computer processors, the program instructions comprising:

program instructions to intercept a deployment resource file associated with software prior to deploying the software to a node, wherein the deployment resource file comprises configuration data;

program instructions to identify that a required user generated digital signature is necessary for deployment of the software, the digital signature comprising a message digest of a section, of a plurality of sections, of the deployment resource file encrypted with a private key of the required user, wherein:

program instructions to identify that the required user generated digital signature is necessary for deployment of the software comprise program instructions to retrieve an admission policy; and the admission policy specifies, in the deployment resource file, a corresponding user signature required for each section of the plurality of sections;

program instructions to verify presence and authenticity of the required user generated digital signature within the deployment resource file;

program instructions, responsive to verifying the presence and authenticity of the required user generated digital signature, to deploy the software to the node in accordance with the deployment resource file.

16. The computer system of claim 15, wherein:

the admission policy further specifies the required user generated digital signature that is necessary for deployment of the software;

the admission policy is external to the deployment resource file; and program instructions to verify the presence and the authenticity of the required user generated digital signature within the deployment resource file comprises program instructions, collectively stored on the one or more computer readable storage media for execution by at least one of the one or more computer processors, to verify that the required user generated digital signature specified in the admission policy is present within the deployment resource file.

17. The computer system of claim 15, further comprising:

program instructions, collectively stored on the one or more computer readable storage media for execution by at least one of the one or more computer processors, to receive a selection of a section within the deployment resource file for the required user to sign;

program instructions, collectively stored on the one or more computer readable storage media for execution by at least one of the one or more computer processors, to encrypt the selected section with a hash function and the private key; and program instructions, collectively stored on the one or more computer readable storage media for execution by at least one of the one or more computer processors, to append the required user generated digital signature and identification of the section within the deployment resource file.

18. The computer system of claim 17, wherein program instructions to verify the presence and the authenticity of the required user generated digital signature comprise:

program instructions to decrypt the required user generated digital signature; and program instructions to compare a resulting hash function to a hash function associated with data at the section.

19. The computer system of claim 15, wherein the admission policy further specifies, in the deployment resource file, a plurality of sections of a configuration file.

20. The computer system of claim 15, wherein the deployment resource file is a Kubernetes YAML file.

* * * * *